(12) United States Patent  
Awamoto

(10) Patent No.: US 8,448,223 B2  
(45) Date of Patent: May 21, 2013

(54) SECURITY MANAGEMENT PROGRAM, SECURITY MANAGEMENT METHOD, AND PORTABLE TERMINAL DEVICE

(75) Inventor: Yasuhiko Awamoto, Yokohama (JP)

(73) Assignee: Fujitsu Broad Solution & Consulting Inc., Tokyo (JP)

( * ) Notice: Subject to any disclaimer, the term of this patent is extended or adjusted under 35 U.S.C. 154(b) by 318 days.

(21) Appl. No.: 12/801,179

(22) Filed: May 26, 2010

(65) Prior Publication Data

US 2010/0299721 A1 Nov. 25, 2010

Related U.S. Application Data

(63) Continuation of application No. PCT/JP2008/054275, filed on Mar. 10, 2008.

(30) Foreign Application Priority Data

Nov. 30, 2007 (JP) .................................. 2007-309923

(51) Int. Cl.
*G06F 21/00* (2006.01)

(52) U.S. Cl.
USPC ................ 726/3; 713/168; 713/184; 709/227

(58) Field of Classification Search
USPC ........................................................ 726/3, 4
See application file for complete search history.

(56) References Cited

U.S. PATENT DOCUMENTS

| | | | | |
|---|---|---|---|---|
| 7,620,976 | B2 * | 11/2009 | Low et al. ........................ | 726/4 |
| 2002/0010679 | A1 * | 1/2002 | Felsher ........................... | 705/51 |
| 2003/0200468 | A1 * | 10/2003 | Raley et al. ................... | 713/202 |
| 2004/0172552 | A1 * | 9/2004 | Boyles et al. .................. | 713/200 |
| 2005/0066163 | A1 | 3/2005 | Ikenoya | |
| 2005/0283719 | A1 * | 12/2005 | Awamoto et al. .............. | 715/513 |
| 2007/0006322 | A1 * | 1/2007 | Karimzadeh et al. ........... | 726/27 |
| 2007/0226495 | A1 * | 9/2007 | Kim et al. ...................... | 713/168 |
| 2007/0282843 | A1 * | 12/2007 | Beck ................................ | 707/9 |

FOREIGN PATENT DOCUMENTS

| | | |
|---|---|---|
| EP | 1 507 381 | 2/2005 |
| JP | 2002-207638 | 7/2002 |
| JP | 2003-101521 | 4/2003 |
| JP | 2005-064770 | 3/2005 |
| JP | 2006-302191 | 11/2006 |

OTHER PUBLICATIONS

Fast Authenticated Key Establishment Protocols for Self-Organizing Sensor Networks| http://pdf.aminer.org/000/709/584/fast_authenticated_key_establishment_protocols_for_self_organizing_sensor_networks.pdf|2004|Huang et al.*

* cited by examiner

*Primary Examiner* — Taghi Arani
*Assistant Examiner* — Mahfuzur Rahman
(74) *Attorney, Agent, or Firm* — Staas & Halsey LLP

(57) ABSTRACT

A security management program stored in a computer-readable recording medium causes a computer to perform the following steps (1) to (4). (1) A security manager authenticates an authentication target with a prepared authentication method in response to a login request from the authentication target. (2) An application execution unit outputs an authentication request in response to an application execution request which is output from the security manager after the authentication succeeds. (3) A database access unit authenticates the authentication target with the authentication method in response to the authentication request. (4) In response to a database access request from the application execution unit, the database access unit accesses a database in a portable terminal device depending on the authentication performed by the database access unit.

6 Claims, 15 Drawing Sheets

Figure 1:
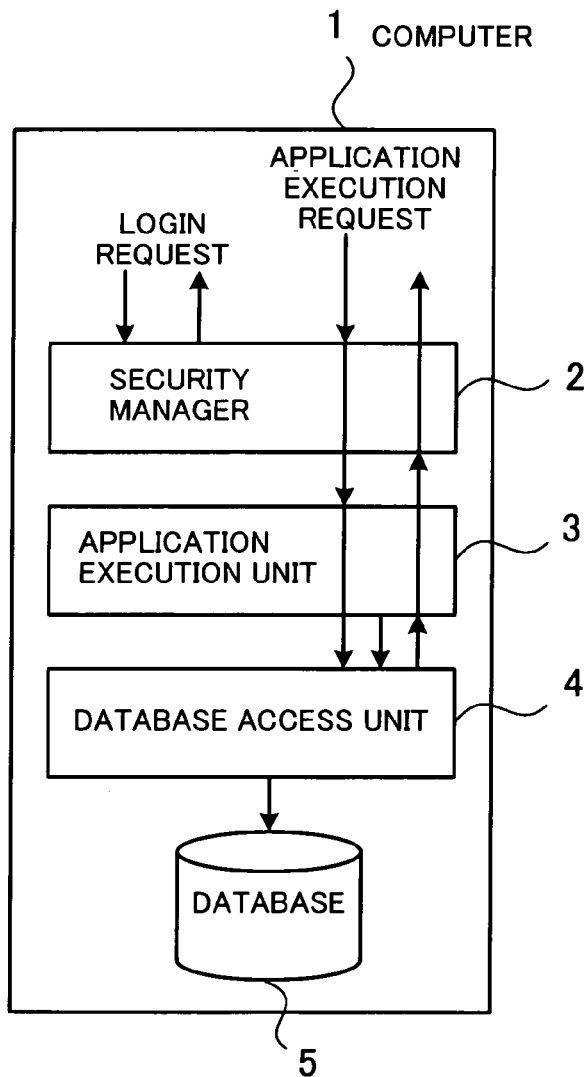

SECURITY MANAGEMENT PROGRAM, SECURITY MANAGEMENT METHOD, AND PORTABLE TERMINAL DEVICE

This application is a continuing application, filed under 35 U.S.C. §111(a), of International Application PCT/JP2008/054275, filed Mar. 10, 2008, it being further noted that priority is based upon Japanese Patent Application No. 2007-309923, filed Nov. 30, 2007.

FIELD

The embodiment discussed herein is related to a security management program, security management method, and portable terminal device.

BACKGROUND

Recently, portable terminal devices are used in various business situations (for example, distributors' ordering and product inspection, electricity/gas meter reading, and remote inquiry of stock information). For offline business operations, various business data (for example various business-related document forms, sales report documents, publication materials, and presentation materials) may be stored in portable terminal devices. Such business data is better to remain protected even if a portable terminal device is lost.

From the viewpoint of security, conventionally, applications of portable terminal devices are developed exclusively for predetermined software execution environments (DOJA (called i-appli) (trademark), BREW (trademark), etc.) on predetermined OSs (Operating System: for example, Symbian OS, LINUX (trademark), etc.), and such applications are also used in business operations. The software execution environments provide very high security. Partly because data is created for each application and partly because applications are prohibited from referring to the data of other applications, the data is surely protected.

As described above, data to be protected is under closed environments which do not allow the data to be accessed from others. Even if a portable terminal device is lost, the portable terminal device does not allow its internal data to be accessed unless authentication succeeds (for example, Japanese Laid-open Patent Publication No. 2003-101521).

In the conventional environments, applications are individually developed according to different types of devices. On the other hand, the recent approaches are to standardize applications, and to produce OSs for portable terminals, like WINDOWS MOBILE (trademark), in open environments with the good use of know-how on PC (Personal Computer). The software execution environments are also shifted so as to provide more compatibility.

However, the OSs for portable terminals in open environments are provided with a file access function, which permits even confidential data to be accessed without authentication. In addition, it may be difficult to disable the file access function in terms of the properties of the OSs in open environments.

Therefore, it is demanded that portable terminals become capable of protecting confidential data from unauthorized accesses which are made with such a file access function.

SUMMARY

According to an aspect of the invention, a computer-readable recording medium storing a security management program for managing security of a portable terminal is provided. This security management program causing a computer to perform: authenticating, by a security manager, an authentication target with a prepared authentication method in response to a login request from the authentication target; outputting, by an application execution unit, an authentication request in response to an application execution request which is output from the security manager after the authentication by the security manager succeeds; authenticating, by a database access unit, the authentication target with the authentication method in response to the authentication request; and accessing, by the database access unit, a database provided in the portable terminal device depending on the authentication performed by the database access unit, in response to a database access request from the application execution unit.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWING(S)

Figure 2:
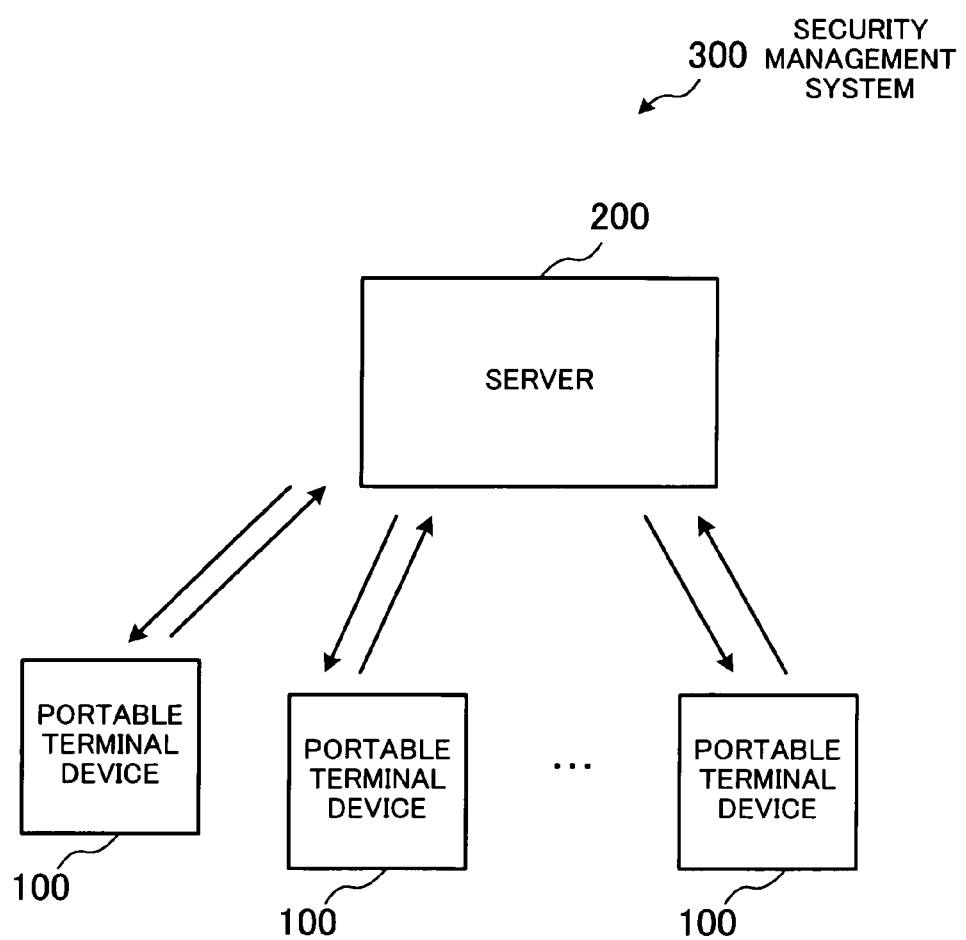
Figure 3:
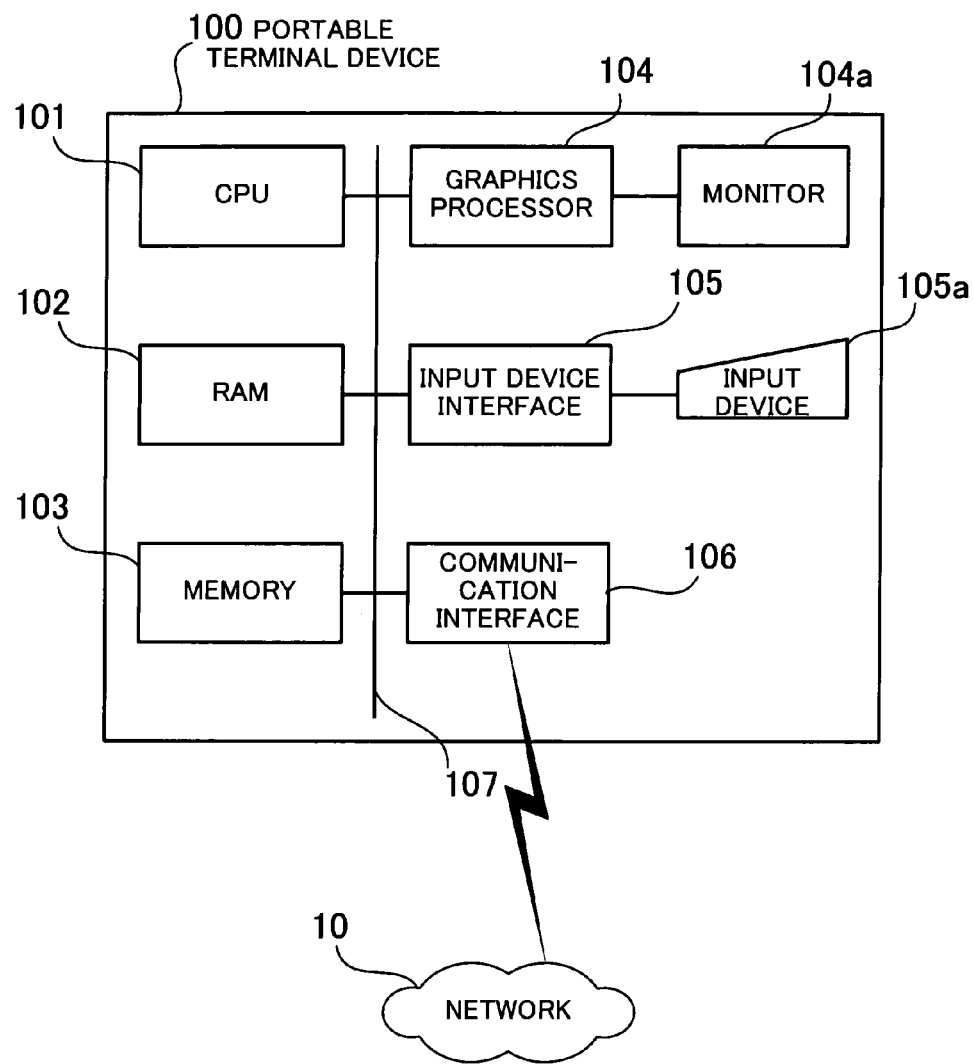
Figure 4:
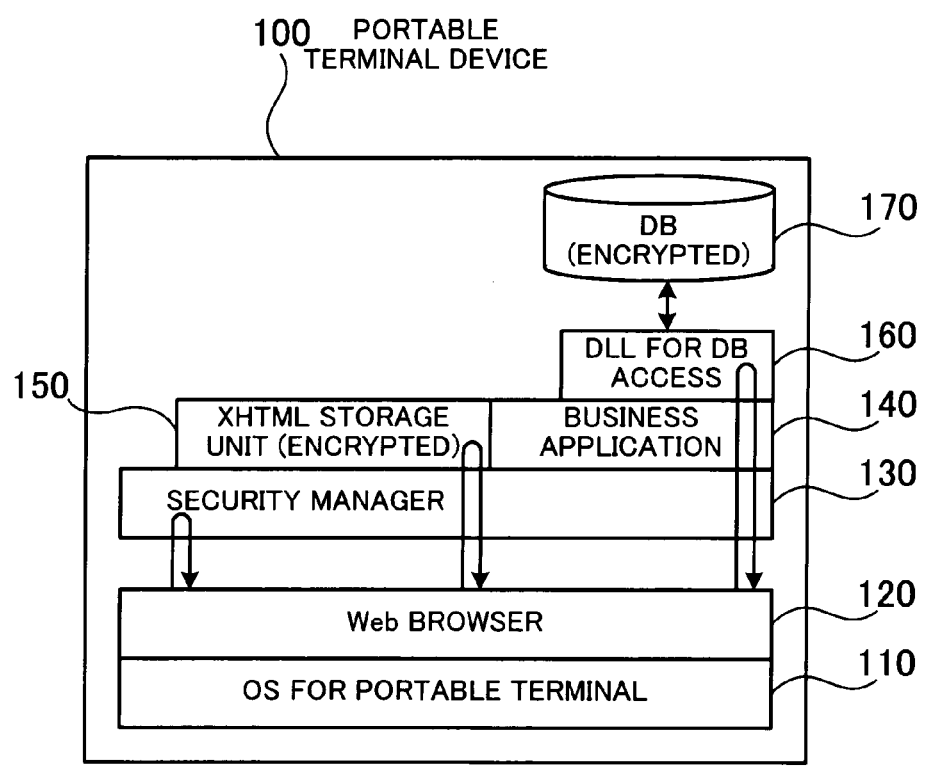
Figure 5:
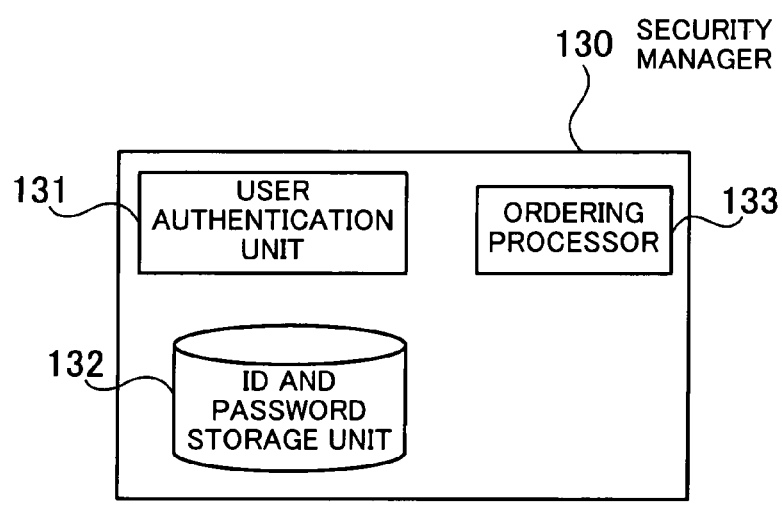
Figure 6:
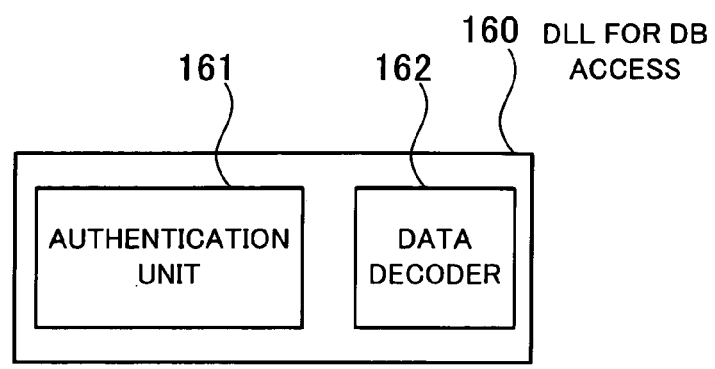
Figure 7:
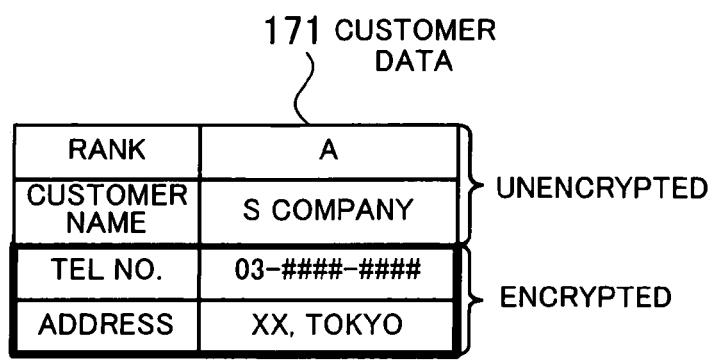
Figure 8:
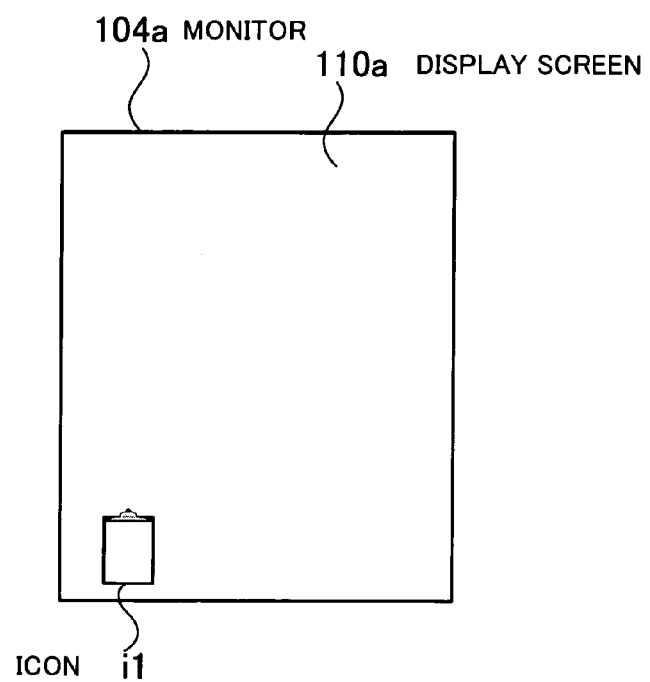
Figure 9:
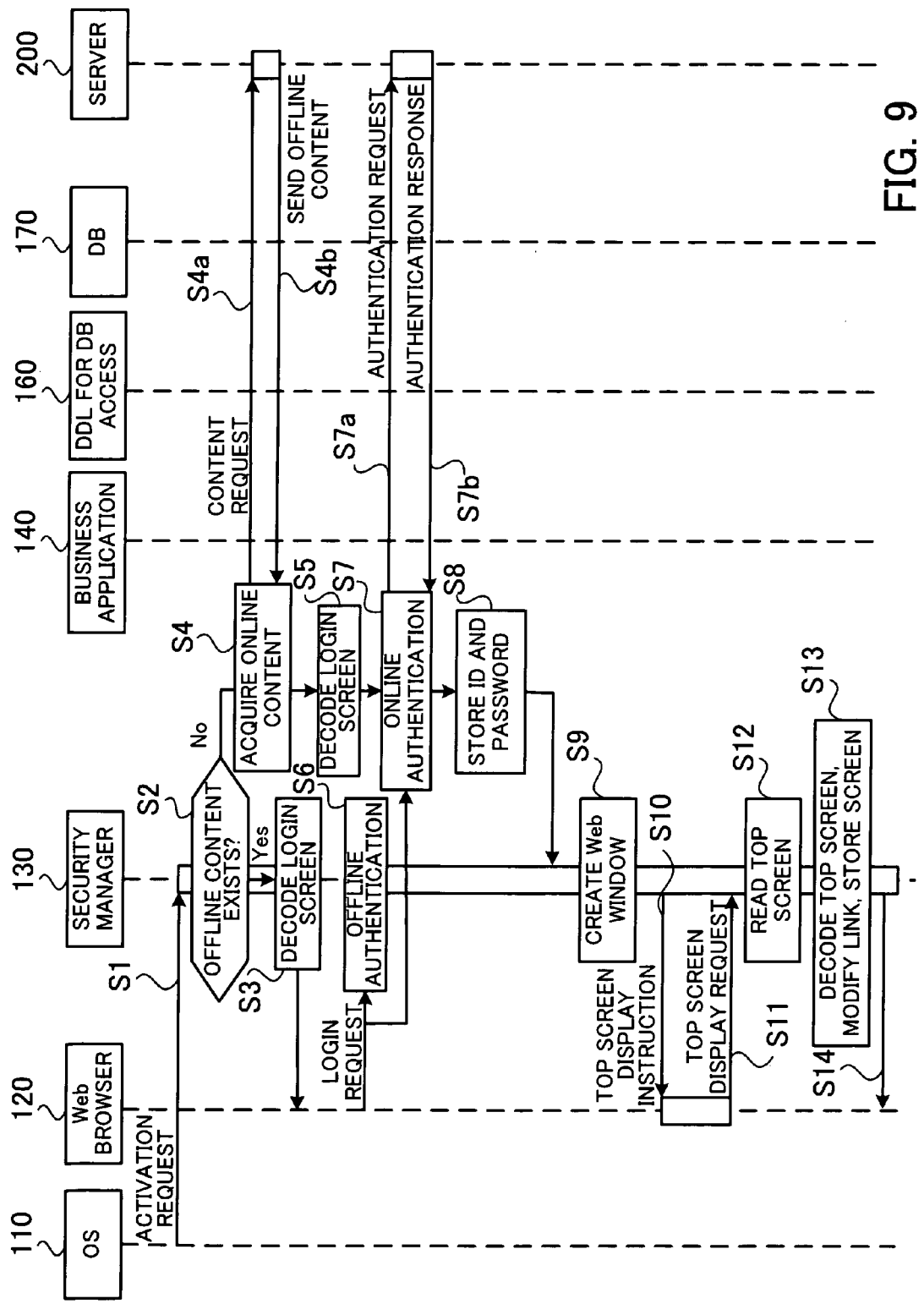
Figure 10:
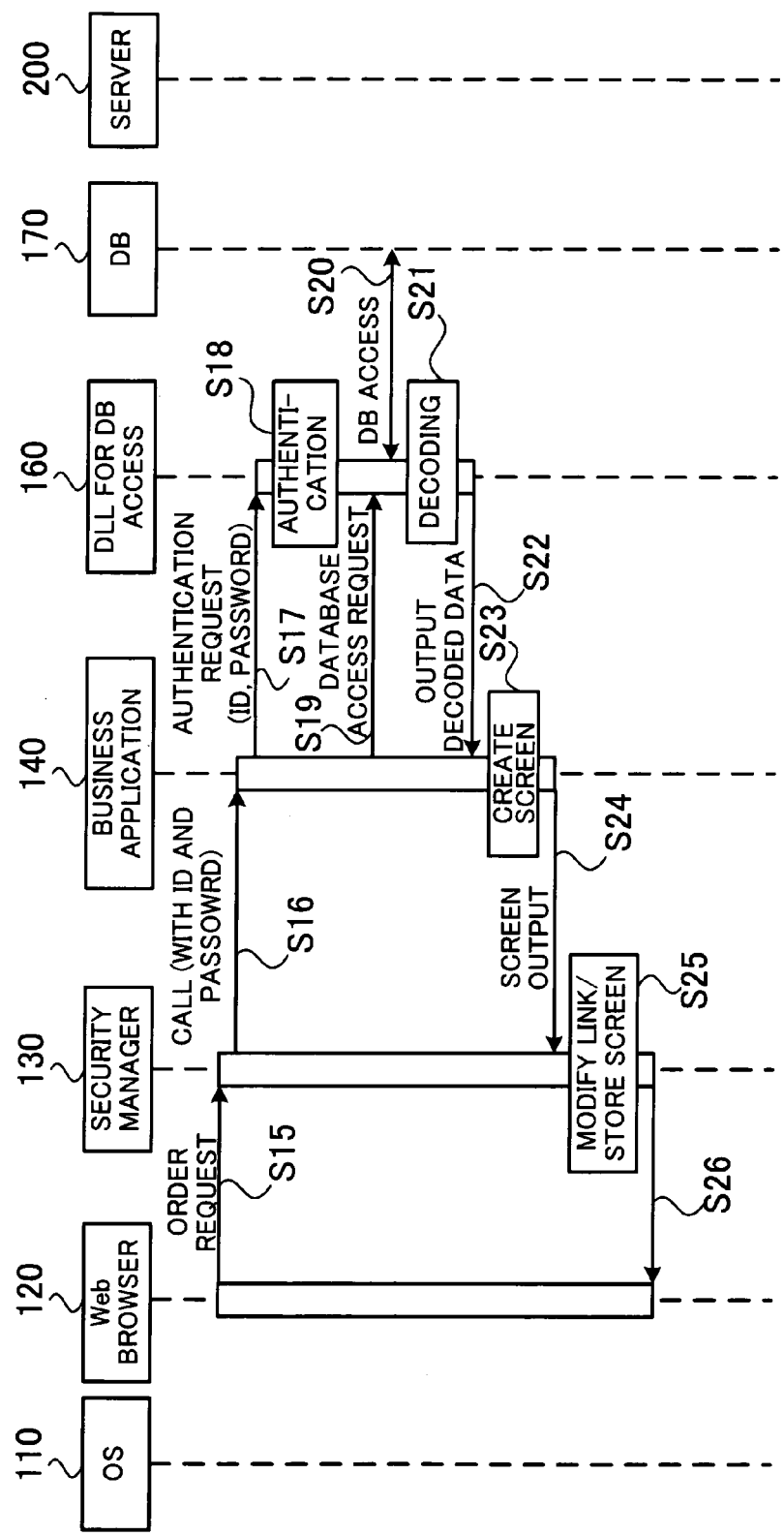
Figure 11:
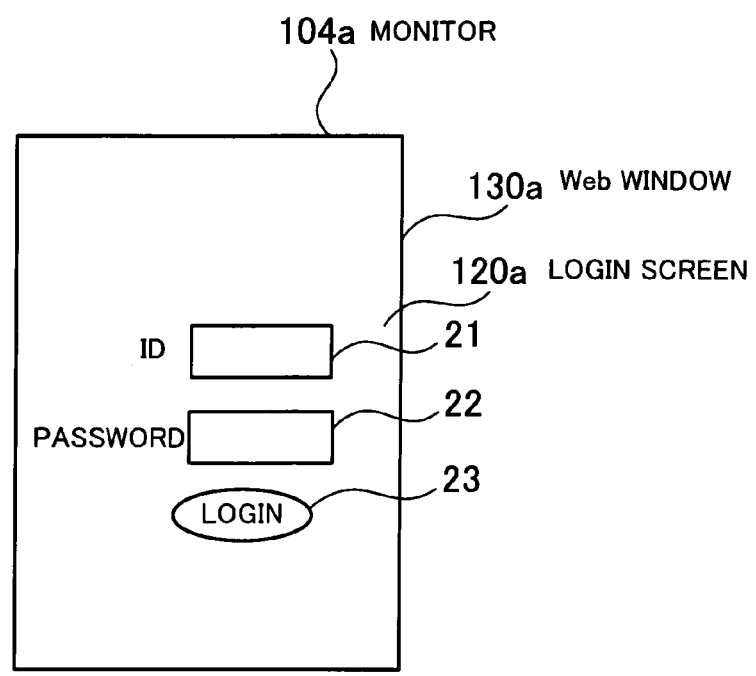
Figure 12:
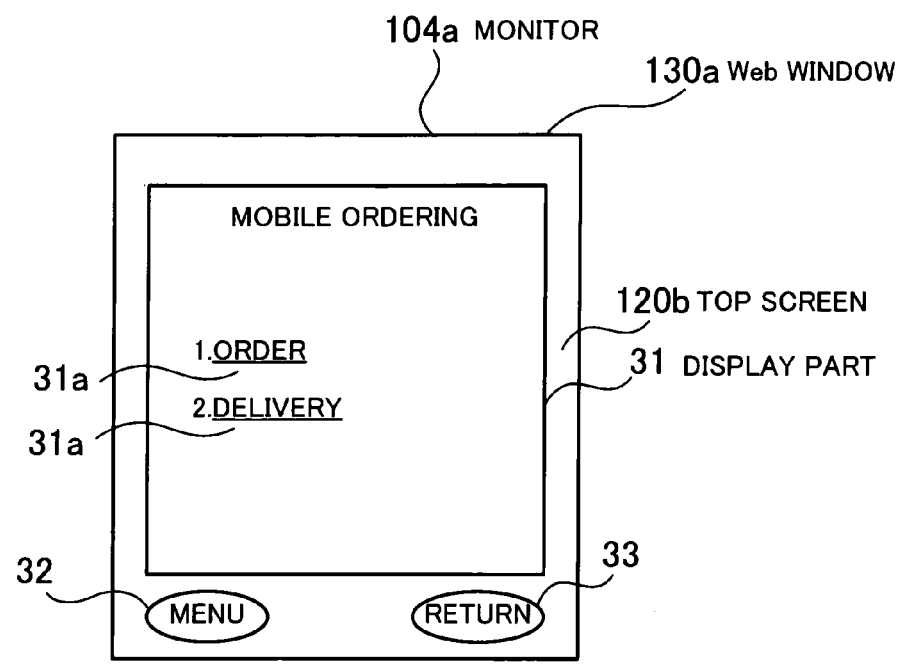
Figure 13:
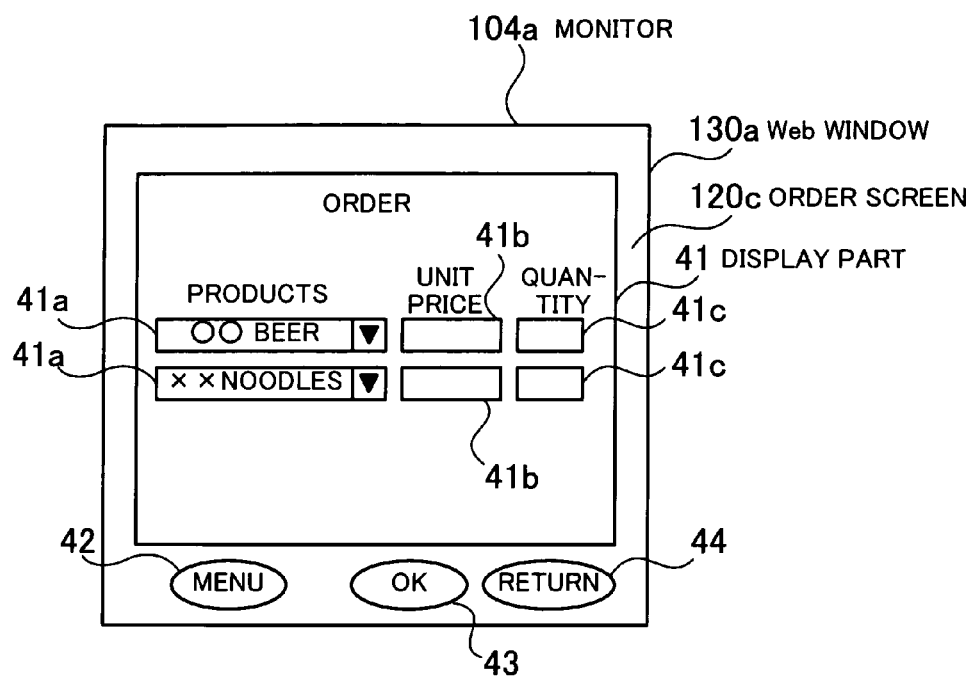
Figure 14:
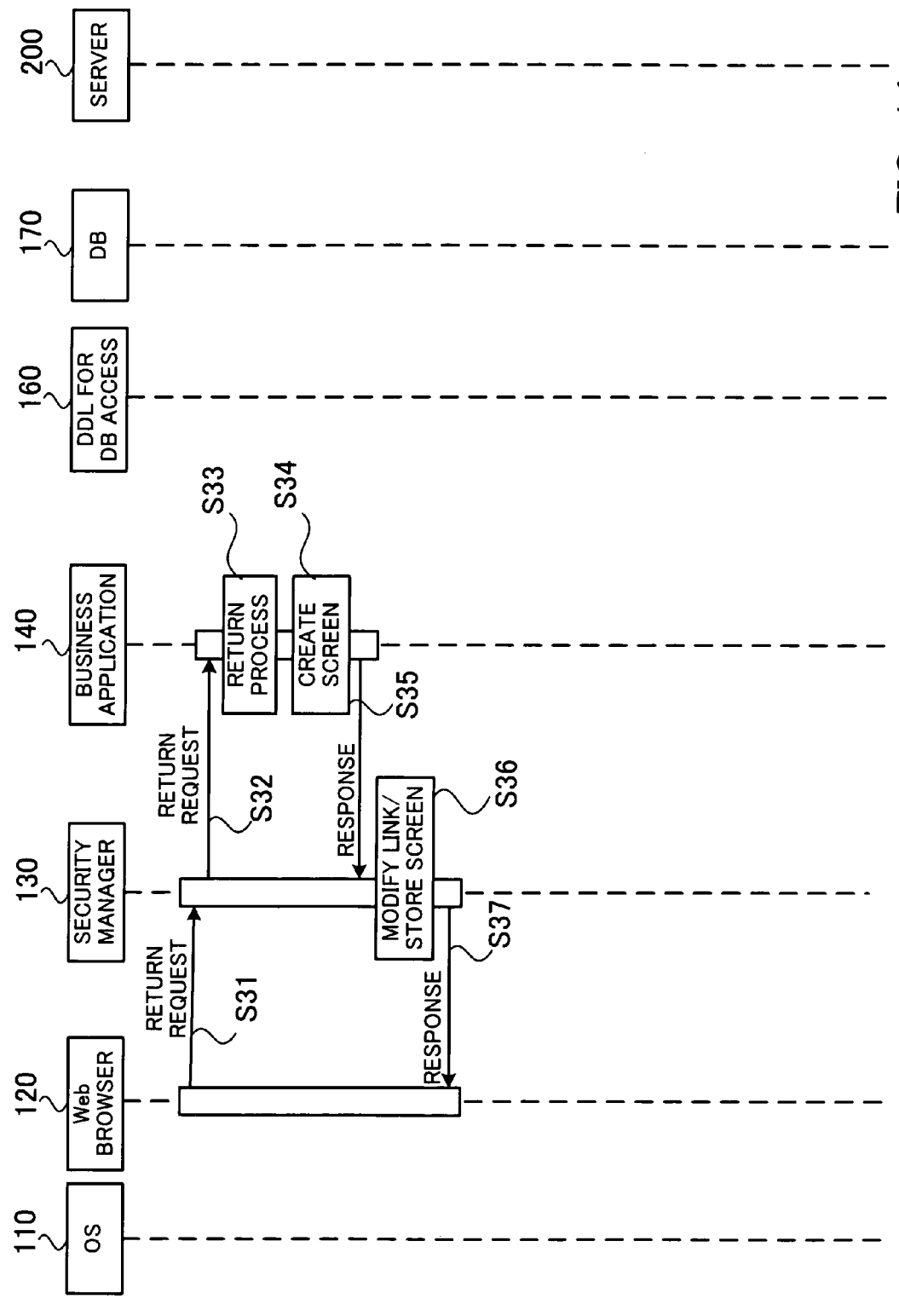
Figure 15:
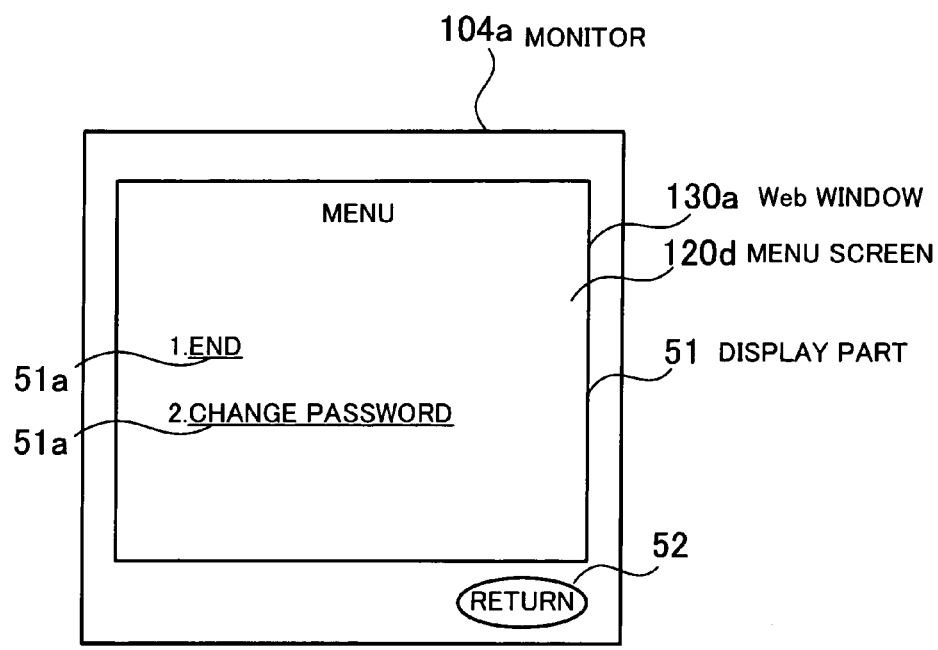

FIG. 1 illustrates the overview of one embodiment;
FIG. 2 is a block diagram of a security management system according to the embodiment;
FIG. 3 illustrates an example hardware configuration of a portable terminal device;
FIG. 4 is a block diagram of the functions of the portable terminal device;
FIG. 5 is a block diagram of the functions of a security manager;
FIG. 6 is a block diagram of the functions of a DLL for database access;
FIG. 7 illustrates an example of data stored in a database;
FIG. 8 illustrates a screen to be displayed on a monitor;
FIGS. 9 and 10 are a sequence diagram of a data access process;
FIG. 11 illustrates a login screen;
FIG. 12 illustrates a top screen to be displayed on the monitor;
FIG. 13 illustrates an order screen to be displayed on the monitor;
FIG. 14 is a sequence diagram of a process to be triggered by clicking a return button; and
FIG. 15 illustrates a menu screen to be displayed by clicking a menu button.

DESCRIPTION OF EMBODIMENT(S)

An embodiment of the present invention will now be described in detail below with reference to the accompanying drawings.

The following description begins with an overview of the present invention and then proceeds to specific embodiments of the invention, wherein like reference numerals refer to like elements throughout.

FIG. 1 illustrates an overview of one embodiment.

A security management program causes a computer 1 provided in a portable terminal device to function as a security manager 2, an application execution unit 3, a database access unit 4, and a database 5, and to thereby perform the following steps (1) to (4).

The security manager 2 authenticates an authentication target with a prepared authentication method (for example, identifier (ID) and password comparison) in response to a login request from the authentication target. In this connection, the login request and an application execution request in step (2) are entered via a Web browser, etc.

The application execution unit 3 outputs an authentication request in response to the application execution request which is output from the security manager 2 after the authentication of step (1) succeeds.

The database access unit 4 authenticates the authentication target with the authentication method in response to the authentication request from the application execution unit 3. The same authentication method as described in above step (1) is employed here.

The database access unit 4 accesses the database depending on the authentication performed by the database access unit 4, in response to a database access request from the application execution unit 3. In this connection, the result of the access is disclosed via the Web browser, etc.

With such a security management program, even if the application execution unit 3 is directly accessed, not via the security manager 2, the application execution unit does not output an authentication request to the database access unit 4, which means that the application execution unit 3 does not call the database access unit 4. As a result, unauthorized accesses are blocked.

Alternatively, even if the database access unit 4 is directly accessed, not via the security manager 2, the database access unit 4 does not access the database 5 unless the authentication process is completed. As a result, unauthorized accesses are blocked.

The following describes a specific embodiment.

FIG. 2 is a block diagram of a security management system according to the embodiment.

A security management system 300 according to this embodiment constitutes a wireless network with plural (N) portable terminal devices 100 which communicate packet data with each other, and a server 200.

Each portable terminal device 100 has a communication function, a business (in this embodiment, product ordering operation) execution function, and a printing function.

The server 200 manages each portable terminal device 100, and provides various data such as offline content to the portable terminal devices 100. The server 200 also authenticates the portable terminal devices 100 online according to necessity.

The following describes relationships between one portable terminal device 100 and the server 200.

FIG. 3 illustrates an example hardware configuration of a portable terminal device.

The portable terminal device 100 is entirely controlled by a CPU (Central Processing Unit) 101. Connected to the CPU 101 via a bus 107 are a RAM (Random Access Memory) 102, a memory 103, a graphics processor 104, an input device interface 105, and a communication interface 106.

The RAM 102 temporarily stores part of an OS (Operating System) program and application programs to be executed by the CPU 101, as well as various data for CPU processing. The memory 103 stores the OS and application programs, as well as program files.

The graphics processor 104 is connected to a monitor 104a, and is designed to display images on the screen of the monitor 104a under the control of the CPU 101. The input device interface 105 is connected to an input device 105a provided with ten keys, and is designed to transfer signals from the input device 105a to the CPU 101 via the bus 107.

The communication interface 106 is connected to a wireless network 10, and is designed to communicate data with the server 200 over the wireless network 10.

The processing functions of this embodiment are realized with such a hardware configuration. To perform ordering operation with the portable terminal device 100 configured as above, the portable terminal device 100 has the following functions.

FIG. 4 is a block diagram of the functions of the portable terminal device.

The portable terminal device 100 has an OS for portable terminal 110, a Web browser 120, a security manager 130, a business application 140, an XHTML storage unit (content storage unit) 150, and a DLL for database (DB) access 160; and a database 170. Out of these, the security manager 130, the business application 140, the XHTML storage unit 150, the DLL for database access 160, and the database 170 are functions dedicated to the ordering operation.

In addition, the XHTML storage unit 150 and database 170 store encrypted data.

The OS for portable terminal 110 has a file access function for accessing various internal files of the portable terminal device 100. However, accesses to the XHTML storage unit 150 and the database 170 (encrypted data portions) are allowed only when an authentication process (described later) is successful.

As the OS for portable terminal 110, Windows mobile (trademark) is used, for example, but the OS is not limited thereto.

The Web browser 120 acquires desired document files, image files, audio files, etc. in response to user operation, locally from the portable terminal device 100 or by downloading them from the server 200 over the wireless network 10, and analyzes their layouts to display and/or reproduce them. As to the ordering operation, for example, to make a request for accessing the XHTML storage unit 150, a path to a storage location of XHTML (for example, http://localhost/***/top.html) is designated.

As the Web browser 120, an INTERNET EXPLORER (trademark) or OPERA (trademark) is used, for example, but the Web browser is not limited thereto.

As illustrated in FIG. 4, requests from the Web browser 120 which are made in the ordering operation are always passed through the security manager 130.

In addition, a controller (component) provided with the functions of the Web browser 120 prohibits the Web browser 120 from retuning to a previous screen, going to a next screen, or viewing history.

FIG. 5 is a block diagram of the functions of the security manager.

The security manager 130 includes a user authentication unit 131, an ID and password storage unit 132, and an ordering processor 133.

The user authentication unit 131 performs an authentication process to judge whether a login request has been made from a rightful user. This authentication process requires a user ID and password. For the first time, the user authentication unit 131 issues an authentication request to a server so as to perform the authentication online with the server. The ID and password used in this authentication process are then encrypted and stored in the ID and password storage unit 132. The second and subsequent authentication is performed offline with the stored ID and password.

The ordering processor 133 starts to operate after the user is authenticated, and displays a Web window on the monitor 104a to execute the Web browser 120 on this window, so as to provide the user with screens for various operations. In this connection, the screens are encrypted and stored in the XHTML storage unit 150.

Then, the ordering processor 133 performs various processes in accordance with requests entered via the Web browser by the user; For example, in response to a request for accessing the XHTML storage unit 150, the ordering processor 133 extracts encrypted data from the access destination, decodes and displays it on the Web browser 120. As another example, in response to a request for accessing the database 170, the ordering processor 133 accesses the database to extract data, and then gives the data to the process working on the Web browser 120.

As described above, all accesses to the XHTML storage unit 150 and the database 170 are always made via the security manager 130.

In addition, the ordering processor 133 is provided with a function of rejecting data inputs after no access is made to the ordering processor 133 via the Web browser for a predetermined period of time.

Referring back to FIG. 4. An access from the security manager 130 to the database 170 is made via the business application 140 and the DLL for database access 160.

The business application 140 is an ordering management application that was produced using functions provided as a library (DLL) of the OS for portable terminal 110. This application is a general-purpose application (for example, business support application like SFA) produced by developers.

The business application 140 operates in response to a call from the security manager 130. This call includes an ID and password necessary for the DLL for database access 160 to perform authentication (described later). After the authentication by the DLL for database access 160 succeeds, it becomes possible to read data from the database 170.

The XHTML storage unit 150 stores content (offline content) for displaying a login screen on the Web browser 120, content for displaying a top screen for ordering management on the Web browser, etc. in XHTML format.

The DLL for database access 160 is a DLL which the OS for portable terminal 110 provides to protect the database 170, and is called when the security manager 130 accesses the database 170.

FIG. 6 is a block diagram of the functions of the DLL for database access.

The DLL for database access 160 includes an authentication unit 161 and a data decoder 162.

The authentication unit 161 performs an authentication process when the business application 140 accesses the database 170. As described above, this process is performed with the user ID and password included in a call made by the security manager 130.

After the authentication succeeds, the data decoder 162 extracts and decodes data from the database 170 in response to a database access request from the business application 140, and outputs the data to the business application 140.

The database 170 contains data (customer data). At least, part of the data has been encrypted. This customer data with encrypted data is distributed from the server 200 as it is.

FIG. 7 illustrates an example of data stored in the database.

The customer data 171 includes a rank indicating how important a customer is, a customer name, a telephone number, and an address. In addition to these, a contact history, business process, sales schedule, etc. may be included.

In the customer data 171, the telephone number and address are encrypted while the rank and customer name are not encrypted.

The following describes how to access the customer data in the database 170 with the portable terminal device 100.

Provided with a GUI (Graphical User Interface), the OS for portable telephone 110 displays an icon for starting to execute an ordering operation on the monitor 104a.

FIG. 8 illustrates a screen to be displayed on the monitor.

The monitor 104a has a display screen 110a with an icon it for application activation. When the user selects the icon it by clicking it, the security manager 130 is activated, thereby starting the ordering operation.

FIGS. 9 and 10 are a sequence diagram of a data access process.

By a user clicking the icon if, an activation request is outputted to the security manager 130 (step S1).

The activated security manager 130 displays a login screen. At this time, the security manager 13 determines whether the XHTML storage unit 150 stores encrypted content including a login screen (offline content) (step S2). When there is such content (Yes in step S2), the security manager 130 decodes and displays the login screen included in the content (step S3).

When there is no such content (No in step S2), the security manager 130 acquires content (step S4). Specifically, the security manager 130 issues a content request to the server 200 (step S4a), and receives encrypted content from the server 200 (step S4b). Then, the security manager 130 decodes and displays the login screen included in the received encrypted content (step S5).

FIG. 11 illustrates a login screen.

A Web window (window frame) 130a is displayed within the frame of the monitor 104a.

The login screen 120a has an ID box 21 and a password box 22, as well as a login button 23.

When the user presses the login button 23 after entering his/her ID and password in the ID box 21 and password box 22 with the input device 105a, the security manager 130 authenticates the user. In this connection, when an ID and password exist in the ID and password storage unit 132, the security manager 130 performs offline authentication (step S6). Specifically, in this authentication, the entered ID and password are compared with the ID and password stored in the ID and password storage unit 132.

When no ID or password exists in the ID and password storage unit 132, on the contrary, the security manager 130 performs online authentication (step S7). Specifically, the security manager 130 issues an authentication request to the server 200 (step S7a) which then compares the received ID and password with IDs and passwords stored therein to determine whether to authorize the user. The server 200 outputs the authentication result together with the ID and password to the security manager 130 as an authentication response (step S7b).

Then, the security manager 130 encrypts and stores the received ID and password in the ID and password storage unit 132 (step S8).

When the user is authenticated, the security manager 130 creates a Web window 130a (step S9) and instructs the Web browser 120 to display a top screen of the created Web window 130a (step S10).

The Web browser 120 requests the security manager 130 to display the top screen of the Web window 130a within the window frame (step S11).

The security manager 130 reads the encrypted top screen from the XHTML storage unit 150 (step S12), decodes the read top screen, and modifies the links in the top screen so that their accesses pass through the security manager 130, and stores the modified top screen (step S13).

Then, the security manager 130 outputs the top screen to the Web browser 120 (step S14).

FIG. 12 illustrates a top screen to be displayed on the monitor.

The top screen 120b has a display part 31 with a title (Mobile ordering) and a link part (Order and Delivery) 31a, a menu button 32, and a return button 33.

By the user clicking Order in the link part 31a, an order screen appears. By clicking Delivery in the link part 31a, a delivery screen appears. By clicking the menu button 32, a menu screen (described later) appears. By clicking the return button 33, a return process (described later) is performed.

Now, a process to be triggered by clicking Order in the link part 31a will be described.

When Order is clicked, the Web browser 120 outputs an order request to the security manager 130 (step S15 in FIG. 10).

The security manager 130 calls the business application 140 with doGet function (doGet (HttpServletRequest request, HttpServletResponse response, String id, String pass)) (step S16). At this time, the security manager 130 also decodes and outputs the ID and password stored in the ID and password storage unit 132.

The business application 140 outputs an authentication request to the DLL for database access 160 with Passcheck function (passcheck (String id, String pass)) (step S17). At this time, the business application 140 also outputs the ID and password.

The DLL for database access 160 performs the authentication with the received ID and password (step S18).

Then, the business application 140 outputs a database access request (SQLCall (String SQL, String id, String pass)) to the DLL for database access 160. (Step S19).

When the authentication has succeeded, the DLL for database access 160 accesses the database 170 to extract the customer data 171 therefrom (step S20).

The DLL for database access 160 then decodes the encrypted portion of the extracted customer data 171 (step S21), and outputs the resultant to the business application 140 (step S22).

The business application 140 creates an order screen for displaying the received customer data 171 (step S23) and outputs the screen to the security manager 130 (step S24).

The security manager 130 modifies the links in the order screen received from the business application 140 so that their accesses pass through the security manager 130, and stores the modified order screen (step S25). The security manager 130 then outputs the order screen to the Web browser 120 (step S26).

FIG. 13 illustrates an order screen to be displayed on the monitor.

The order screen 120c has a display part 41 including a title (Order) and a product selection part 41a provided for each product, a unit price box 41b, and a quantity box 41c, a menu button 42, an OK button 43, and a return button 44.

When the user selects a product select button of the product selection part 41a, a plurality of product names are displayed. The user selects one of them. When the user selects the OK button 43 after having a unit price and quantity entered in the unit price box 41b and quantity box 41c, respectively, the Web browser 120 sends information indicating the fixed unit price and quantity to the server 200.

Clicking the menu button 42 shifts the screen to the menu screen (described later). Clicking the return button 44 triggers a process described below.

FIG. 14 is a sequence diagram of the process to be triggered by clicking the return button.

When the return button 44 is clicked, the Web browser 120 outputs a return request to the security manager 130 (step S31), and the security manager 130 calls the business application 140 (step S32).

The business application 140 performs the return process (step S33). Specifically, the business application 140 detects a previous screen according to the current screen, creates the previous screen (step S34), and outputs it to the security manager 130 as a response (step S35).

The security manager 130 modifies the links in the received previous screen received from the business application 140 so that their accesses pass through the security manager 130, and stores the previous screen (step S36), and outputs the screen to the Web browser 120 as a response (step S37).

FIG. 15 illustrates a menu screen to be displayed by clicking the menu button.

The menu screen 120d has a display part 51 including a title (Menu) and a link part (End, Change password) 51a, and a return button 52.

When the user clicks End in the link part 51a, the connection to the security manager 130 is disconnected. By clicking Change password in the link part 51a, the screen is shifted to a password change screen (not illustrated) for changing a password to be used in authentication. By clicking the return button 52, the business application 140 performs the return process described earlier.

As described above, the portable terminal device 100 in the security management system 300 according to the embodiment does not permit any access from the business application 140 to the database 170 unless an entered ID and password are authenticated. Therefore, only accesses made via the security manager 130 are allowed to activate the DLL for database access 160, thereby making it possible to block direct accesses to the database 170 with the file access function of the OS for portable terminal 110. Specifically, the database 170 is protected by the security manager 130 performing the user authentication when the business application 140 is executed. In addition, even if the business application 140 is directly accessed, the database 170 is protected because accesses from the business application 140 to the database 170 are blocked unless the DLL for database access 160 performs the authentication in response to an authentication request from the business application 140. Alternatively, even if the DLL for database access 160 is directly accessed, the database 170 is protected from unauthorized accesses because accesses to the database 170 are blocked unless the DLL for database access 160 performs the authentication which is required for every access.

As a result, a leak of data stored in the database 170 can surely be prevented.

Further, even without knowing about decoding algorithms, the business application 140 can desirably be designed, provided that a function of outputting received authentication requests and a function of extracting data from the database 170 are incorporated. Therefore, the security management method of this system is independent of application type.

The above embodiment has been described by way of an example of product ordering operation. This embodiment, however, is not limited thereto, and may be applied for product inspection, electricity/gas meter reading, remote inquiry of stock information, etc.

Further, the above embodiment uses an ID and password in authentication. This embodiment, however, is not limited to this and may employ fingerprint authentication, or the like.

The processing functions described above are realized by a general computer. In this case, a program is prepared, which describes processes for the functions to be performed by the portable terminal device 100. The program is executed by a computer, whereupon the aforementioned processing functions are accomplished by the computer. The program describing the processes may be recorded on a computer-readable recording medium. Computer-readable recording media include magnetic recording devices, optical discs, magneto-optical recording media, semiconductor memories, etc. The magnetic recording devices include Hard Disk Drives (HDD), Flexible Disks (FD), magnetic tapes, etc. The optical discs include DVDs (Digital Versatile Discs), DVD-RAMS (Random Access Memory), CD-ROMs (Compact Disc Read-Only Memory), CD-R (Recordable)/RW (Re-Writable), etc. The magneto-optical recording media include MOs (Magneto-Optical disk) etc.

To distribute the program, portable recording media, such as DVDs and CD-ROMs, on which the program is recorded may be put on sale. Alternatively, the program may be stored in the storage device of a server computer and may be transferred from the server computer to other computers through a network.

A computer which is to execute the security management program stores in its storage device the program recorded on a portable recording medium or transferred from the server computer, for example. Then, the computer runs the program. The computer may run the program directly from the portable recording medium. Also, while receiving the program being transferred from the server computer, the computer may sequentially run this program.

The proposed security management program, security management method, and portable terminal device according to the embodiment can surely protect information in databases, irrespective of the types of OSs of portable terminal devices.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiment(s) of the present invention has(have) been described in detail, it should be understood that various changes, substitutions, and alterations could be made thereto without departing from the spirit and scope of the invention.

What is claimed is:

1. A non-transitory computer-readable recording medium storing a security management program for managing security of a portable terminal device, the security management program causing a computer to perform:
   authenticating, by a security manager, an authentication target with a prepared authentication method in response to a login request from the authentication target;
   outputting, by an application execution unit, an authentication request in response to an application execution request which is output from the security manager after the authentication by the security manager succeeds;
   authenticating, by a database access unit, the authentication target with the prepared authentication method in response to the authentication request; and
   accessing, by the database access unit, a database provided in the portable terminal device depending on the authentication performed by the database access unit, in response to a database access request from the application execution unit, and
   storing content including an encrypted screen, and
   wherein the security manager decodes and displays the content when the authentication target is authenticated,
   the security manager authenticates the authentication target based on authentication information received from the authentication target, and
   the security manager displays the content on a web browser, and outputs an authentication request including the authentication information to the application execution unit in response to a database browsing request entered via the web browser.

2. The non-transitory computer-readable recording medium according to claim 1, wherein:
   data in the database is encrypted, and
   the database access unit decodes the data stored in the database in response to the database access request from the application execution unit after the authentication by the database access unit succeeds, and outputs the decoded data to the application execution unit.

3. The non-transitory computer-readable recording medium according to claim 1, wherein:
   the security manager authenticates the authentication target based on authentication information received from the authentication target,
   the security manager outputs a function including the authentication information, as the application execution request, to the application execution unit, and
   the application execution unit outputs the authentication information included in the function to the database access unit.

4. The non-transitory computer-readable recording medium according to claim 1, wherein the security manager determines in response to the login request whether offline content exists, and performs online authentication when the offline content does not exist.

5. A security management method for managing security of a portable terminal device, the security management method comprising:
   authenticating, by a security manager, a source of a data access with a prepared authentication method in response to a data access request;
   outputting, by an application execution unit, a database access request in response to the data access request from the security manager;
   authenticating, by a database access unit, the source of the data access with the prepared authentication method in response to the database access request; and
   accessing, by the database access unit, a database depending on the authentication performed by the database access unit, and
   storing content including an encrypted screen, and
   wherein the security manager decodes and displays the content when the authentication target is authenticated,
   the security manager authenticates the authentication target based on authentication information received from the authentication target, and
   the security manager displays the content on a web browser, and outputs an authentication request including the authentication information to the application execution unit in response to a database browsing request entered via the web browser.

6. A portable terminal device for managing security, comprising:
   a database:
   a security manager to authenticate an authentication target with a prepared authentication method in response to a login request from the authentication target;

an application execution unit to output an authentication request in response to an application execution request which is output from the security manager after the authentication by the security manager succeeds; and a database access unit to authenticate the authentication target with the prepared authentication method in response to the authentication request, wherein the database access unit accesses the database depending on the authentication performed by the database access unit in response to a database access request from the application execution unit, and wherein content including an encrypted screen is stored, and wherein the security manager decodes and displays the content when the authentication target is authenticated, the security manager authenticates the authentication target based on authentication information received from the authentication target, and the security manager displays the content on a web browser, and outputs an authentication request including the authentication information to the application execution unit in response to a database browsing request entered via the web browser.

* * * * *